United States Patent
Campian

Patent Number: 6,161,993
Date of Patent: Dec. 19, 2000

[54] CUTTING MACHINE ASSEMBLY

[76] Inventor: Jonathon Campian, 1900 E. 14 Mile Rd., Madison Heights, Mich. 48071

[21] Appl. No.: 09/396,824

[22] Filed: Sep. 14, 1999

[51] Int. Cl.[7] .................................. B23C 9/04; B23B 7/04
[52] U.S. Cl. .......................... 409/135; 144/48.1; 409/137
[58] Field of Search ..................................... 409/137, 138, 409/134, 231; 144/48.1, 252; 457/451

[56] References Cited

U.S. PATENT DOCUMENTS

| | | | |
|---|---|---|---|
| 4,051,880 | 10/1977 | Hestily | 144/252.1 |
| 4,364,695 | 12/1982 | Lenz | 409/135 U X |
| 4,742,855 | 5/1988 | Hartley | 409/137 |
| 5,152,327 | 10/1992 | Shoda | 409/134 |

*Primary Examiner*—William Briggs
*Attorney, Agent, or Firm*—Gifford, Krass, Groh, Sprinkle, Anderson & Citkowski, P.C.

[57] ABSTRACT

A cutting machine assembly is disclosed having a motor assembly with a motor housing, a motor shaft and spaced bearings which rotatably mount the motor shaft to the housing at opposite ends of electrical motor windings. A cutting tool is detachably secured to a forward end of the motor shaft. A casing is disposed around the motor and this casing has a first axial end secured to the motor housing adjacent the forward end of the shaft such that the casing forms an annular chamber between the casing and the motor housing. At least one and preferably several openings are formed in the first axial end of the casing adjacent the cutting tool and these openings are open to the annular chamber formed between the casing and the motor housing. An air vacuum is fluidly connected to the opposite axial end of the annular chamber so that, upon actuation, the air vacuum inducts air through the casing openings and through the annular chamber. The air vacuum serves not only to cool the motor contained within the motor housing, but also to induct debris caused by the cutting operation to a debris collection area.

3 Claims, 2 Drawing Sheets

CUTTING MACHINE ASSEMBLY

BACKGROUND OF THE INVENTION

I. Field of the Invention

The present invention relates to an improved cutting machine assembly for cutting a workpiece made of styrofoam or similar material.

II. Description of the Prior Art

Forms made of styrofoam or similar material are frequently used in casting operations. Such forms are typically cut in the shape of the desired casting and the mold material, known as green sand, is applied to the outside of the styrofoam form. The styrofoam form is then liquefied by heating and removed by pouring from the resulting sand mold. After its removal, the sand mold is filled with the molten metal in the conventional fashion thus forming the casting.

It has been the previous practice to construct the styrofoam forms by hand cutting the styrofoam from styrofoam blocks. For large castings, multiple blocks are individually cut and the resulting forms are then laminated together to form the final styrofoam form.

The previously known method of hand cutting the styrofoam to the desired shape, however, suffers from a number of disadvantages. One disadvantage is that, as in all hand operations, it is virtually impossible to obtain high accuracy of the final styrofoam form. Such inaccuracies in the cutting of the styrofoam form by hand may require additional machining of the final casting.

A still further disadvantage of cutting the styrofoam form by hand is that measuring and layout errors can and do occur. Depending upon the magnitude of such errors, destruction of the styrofoam form may be necessary.

A still further disadvantage of hand cutting styrofoam forms is that the hand tools used to cut the styrofoam forms can only attain a rough cut of the styrofoam. This rough cut results from the cellular or bead nature of the styrofoam so that, when hand cutting occurs, the beads or cells of the styrofoam pull away from the styrofoam block and leave a rough surface. Such a rough surface will cause a corresponding rough surface on the sand mold and a like rough surface on the finished casting. Such rough surfaces disadvantageously increase the amount of machining required for the final cast part.

In order to overcome these previously known disadvantages of hand cutting the styrofoam forms, there have been previously known gantry systems, such as disclosed in my prior U.S. Pat. Nos. 5,429,460 and 5,487,630 in which the styrofoam block is mounted on a stationary planar base. A rotary cutter is then mounted to the gantry above the base and this cutter is movable in all three Cartesian coordinates. A computer system controls the actual movement of the cutter which provides high accuracy and repeatability.

My previous gantry systems of the type disclosed in my patents utilize an elongated cylindrical cutter having an axial throughbore. A plurality of radial pores extended through the cutter and intersect the axial bore to thus establish fluid communication from outside the cutting tool and to the axial bore of the cutting tool.

An air vacuum source was then fluidly connected to the inner axial end of the cutting tool axial bore so that, upon actuation, the vacuum source inducted air and styrofoam debris radially inwardly through the cutting tool radial pores, into the axial passageway of the cutting tool and ultimately to a debris collection area for the vacuum source.

There are, however, two disadvantages of my previously known gantry systems. One disadvantage was that, in certain situations, only a very small diameter cutting tool could be mounted to the gantry motor. In these situations, an axially extending passageway could not be provided through the cutting tool due to its small size. Consequently, when these situations were presented, the removal of the styrofoam debris by the vacuum source could not be achieved.

My previously known gantry system utilized a motor with a tubular motor shaft rotatably secured to the motor housing by spaced bearing assemblies. The cutting tool was secured to an outer or lower end of the drive shaft so that the axial bore of the cutting tool, if present, fluidly communicated with the interior of the motor shaft. The vacuum source was then connected to the end of the motor shaft opposite from the cutting tool so that air inducted by the vacuum source through the cutting tool also passed through the motor shaft and cooled the motor windings.

In some situations, however, the air flow through the motor shaft was either low or nonexistent such that the motor shaft as well as the motor housing around the motor shaft became excessively heated by the motor windings. This heating of the motor housing together with the motor shaft, in turn, caused thermal growth of the motor shaft and the motor housing.

Since the motor housing was secured to the gantry only at its end opposite from the cutting tool, the thermal expansion or thermal growth of the motor housing and the motor shaft effectively vertically displaced the cutting tool. When this occurred, dimensional errors were imparted to the styrofoam cut during the cutting operation.

SUMMARY OF THE PRESENT INVENTION

The present invention provides a cutting machine which overcomes all of the above-mentioned disadvantages of the previously known devices.

In brief, the present invention provides a cutting machine assembly which is particularly well suited for a cutting operation of styrofoam or like material for a gantry system of the type disclosed in my prior aforesaid U.S. patents. However, other applications will also become apparent to one having ordinary skill in the art.

The present invention includes a motor assembly having a motor housing, a motor shaft, an electrical motor winding disposed around the motor shaft, and means for rotatably mounting the motor shaft to the housing at opposite ends of the electrical windings. The motor shaft is rotatably mounted to the motor housing outside each end of the motor winding.

A rotary cutting tool is detachably secured to a lower or free end of the motor shaft by any conventional chuck or the like.

A casing is disposed around the motor housing so that the casing has a first end secured to the motor housing adjacent the end of the motor housing adjacent the cutting tool. This casing is generally annular in shape and forms an annular chamber between the casing and the motor housing.

At least one, and preferably several, circumferentially spaced openings are formed through or adjacent the casing at its end adjacent the cutting tool. As such, the openings establish fluid communication from the area outside of the cutting tool and to the interior chamber formed by the casing.

The motor casing is then secured to the gantry or other support structure while an air vacuum means is fluidly connected to the annular chamber at the end of the casing opposite from the cutting tool. Consequently, upon actuation of the air vacuum means, the air vacuum means inducts both air and debris caused by the cutting tool through the casing openings and annular chamber and ultimately to a debris collection area associated with the air vacuum means. The induction of the air through the annular chamber, however, effectively cools the motor windings thus minimizing thermal expansion even in the event that a small cutting tool without an axial throughbore is used.

Furthermore, the casing, rather than the motor housing, is secured both to the motor housing adjacent the cutting tool and also to the motor support or gantry. Since the casing is maintained relatively cool by the air flow through the annular chamber, any thermal expansion of the motor housing and motor shaft caused by the motor windings will vertically displace the motor housing upwardly, but will not affect the vertical position of the cutting tool. As such, high accuracy of the position of the cutting tool can be maintained during all cutting operations.

BRIEF DESCRIPTION OF THE DRAWING

A better understanding of the present invention will be had upon reference to the following detailed description when read in conjunction with the accompanying drawing, wherein like reference characters refer to like parts throughout the several views, and in which.

DETAILED DESCRIPTION OF A PREFERRED EMBODIMENT OF THE PRESENT INVENTION

Figure 1:
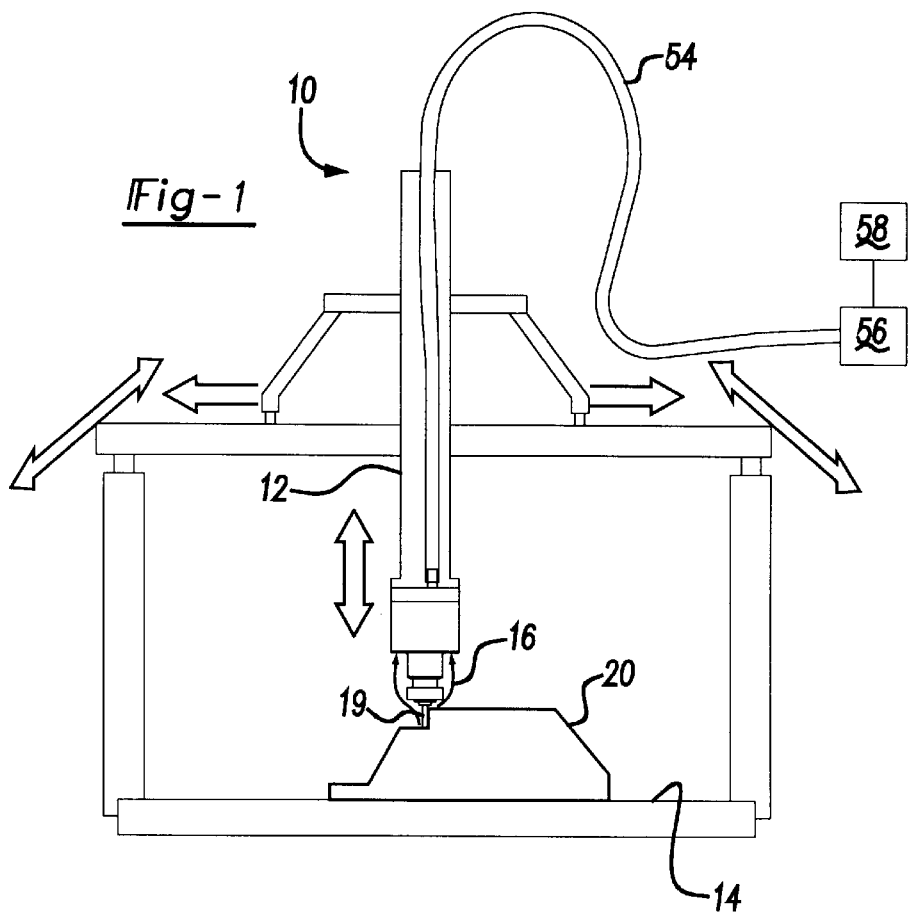
FIG. 1 is a diagrammatic view illustrating the preferred embodiment of the invention utilizing a gantry cutter for cutting a styrofoam block or like material.

With reference first to FIG. 1, a cutting machine assembly 10 of the present invention is there shown and comprises a gantry 12 (illustrated only diagrammatically) mounted above a stationary planar base 14. The gantry 12 includes a motor assembly 16 at its lower end which will be later described in greater detail. However, by any conventional means, the gantry 12 selectively moves the motor assembly 16 with an attached rotary cutter 19 in all three Cartesian coordinates thus effectively machining a block 20 of styrofoam or like material supported on the base 14. The operation of the gantry 12 and thus the position of the motor assembly 16 is typically computer controlled.

Figure 3:
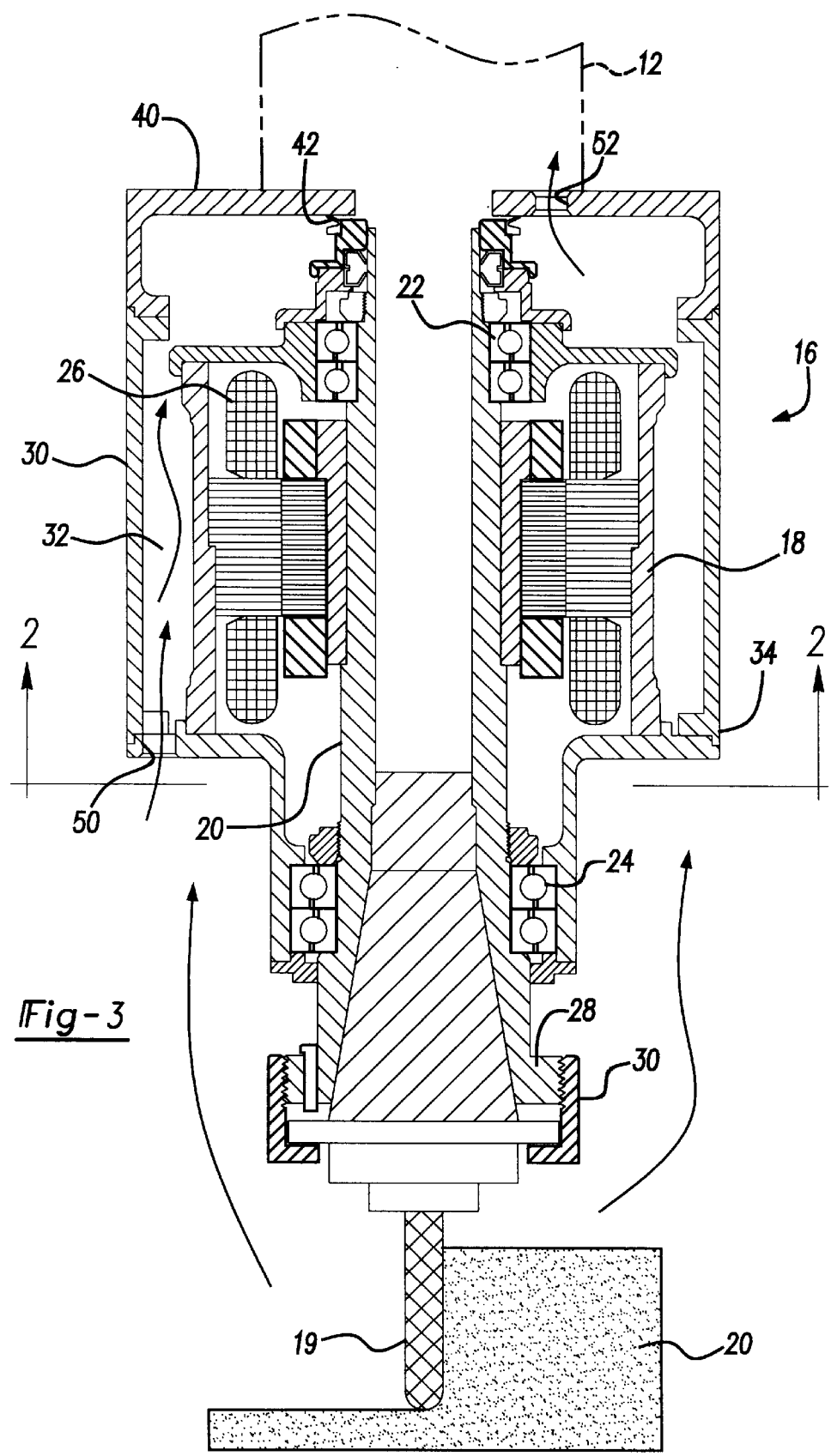
FIG. 3 is a longitudinal sectional view of the motor assembly.

With reference now to FIG. 3, a longitudinal sectional view of the motor assembly 16 is there shown in greater detail. The motor assembly 16 includes a motor housing 18 having a motor shaft 20 rotatably secured to the motor housing 18 by upper and lower spaced bearing assemblies 22 and 24, respectively. As illustrated in FIG. 3, the motor shaft 20 is a hollow motor shaft, although solid motor shafts can alternatively be used.

An electrical motor winding 26 is contained within the motor housing 18 and between the upper bearing assembly 22 and lower bearing assembly 24. Activation of the motor winding 26 rotatably drives the motor shaft 20 in the conventional fashion. The motor windings 26, however, also generate heat in a well known fashion and that heat is transferred to both the motor shaft 20 and the motor housing 19.

Still referring to FIG. 3, the cutting tool 18 is secured to the lower or free end 28 of the motor shaft 20 by any conventional means, such as a chuck 30. Thus, the cutting tool 19,is coaxially secured to the free end 28 of the motor shaft 20 such that rotation of the motor shaft 20 rotatably drives the cutting tool 19.

An annular casing 30 is provided coaxially around and spaced radially outwardly from the motor housing 18. Consequently, the casing 30 forms an annular chamber 32 between the casing 30 and the motor housing 18. Still referring to FIG. 3, the casing 30 is mechanically secured to the motor housing 18 at a position 34 adjacent a lower end of the housing 18. As such, the mechanical connection between the casing 30 and the motor housing 18 is preferably positioned adjacent the cutting tool 19 and below the motor windings 26.

The opposite or upper end 40 of the casing 30 is secured to the gantry 12 or other motor support by any conventional means so that the casing 30 and gantry 12 move in unison with each other. A fluid seal 42 is provided between the upper end 40 of the casing 30 and the motor housing. This fluid seal 42 allows the casing 30 and motor housing 18 to axially move relative to each other while fluidly closing the upper end of the annular chamber 32.

Figure 2:
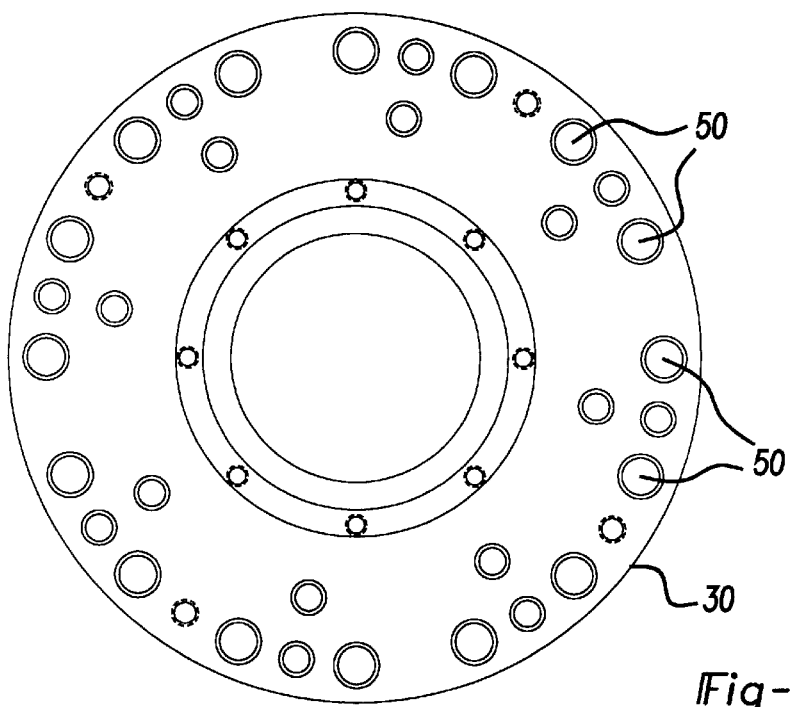
FIG. 2 is a view taken substantially along line 2—2 in FIG. 3.

With reference now to FIGS. 2 and 3, a plurality of circumferentially spaced openings 50 are formed through or adjacent (hereinafter collectively referred to as "through") the outer casing 30 such that the openings 50 are open to the annular chamber 32 and also to the free end of the motor shaft 20 adjacent the cutting tool 18. Similarly, at least one and preferably several fluid ports 52 (FIG. 3) are provided through the upper end 40 of the casing 32. These fluids ports 52 are then fluidly connected by a fluid conduit means 54 (FIG. 1) to a debris collection area 56 as well as an air vacuum means 58.

In operation and assuming both activation of the motor windings 26 as well as the air vacuum means 58, rotation of the cutting tool 19 disperses debris of the styrofoam block 20 radially outwardly from the cutting tool 19. Simultaneously, the air vacuum means 58 inducts air up through the casing ports 50, through the casing chamber 32, out through the casing port 52 and to the air vacuum means 58 via the fluid conduit means 54. Any debris entrained within the air flow through the casing chamber 32 is ultimately collected in the collection bin 56.

The air flow through the casing chamber 32 effectively serves to cool the motor windings 26 and motor housing 18 even in the event that air flow through the interior of the motor shaft 20 is precluded. Cooling of both the motor housing 18 and windings 26 effectively minimizes thermal growth of the motor housing 18 and motor shaft 20.

However, even in the event that the motor windings 26 significantly heat the motor housing 18 and cause thermal growth, this thermal growth is imparted strictly to the motor housing 18 and shaft 20 in an upward direction away from the lower bearing assembly 24 such that the vertical position of the cutting tool 19 remains stationary. This upward growth of the motor shaft 20 and housing 18 occurs since the casing 30 is mechanically secured to the gantry 12 and also to the lower portion of the motor housing 18. The lowermost portion of the motor housing 18, however, is effectively cooled by the air flow created by the air vacuum means 58 thus effectively eliminating downward movement of the cutting tool 18 from thermal growth of the housing 18 and/or shaft 20.

From the foregoing, it can be seen that the present invention provides a cutting machine assembly which overcomes many of the previously known disadvantages of the prior art. Having described my invention, however, many modifications thereto will become apparent to those skilled in the art to which it pertains without deviation from the spirit of the invention as defined by the scope of the appended claims.

I claim:

1. A cutting machine assembly comprising:

a motor assembly having a motor housing, a motor shaft, electrical windings and means for rotatably mounting said motor shaft to said housing at opposite sides of said electrical windings, means for attaching a cutting tool to one end of said shaft, a casing disposed around said motor housing so that said casing encompasses said windings, said motor housing having only a first axial end secured to said casing adjacent said one end of said shaft so that said casing forms an annular chamber between said casing and at least a portion of said motor housing and so that said casing is secured to said motor housing between said one end of said shaft and said electrical windings, said casing forming the sole mechanical support for said motor housing, said casing having at least one opening at its first axial end open to said annular chamber, air vacuum means fluidly connected to said annular chamber at a second axial end of said casing so that, upon actuation, said air vacuum means inducts air through said casing opening and said annular chamber.

2. The invention as defined in claim 1 wherein said at least one opening comprises a plurality of circumferentially spaced openings.

3. The invention as defined in claim 1 wherein said shaft is a tubular shaft.

* * * * *